(12) United States Patent
Bruderek

(10) Patent No.: US 10,318,309 B2
(45) Date of Patent: Jun. 11, 2019

(54) EMBEDDED SYSTEM, OPERATING METHOD AND THE USE THEREOF

(71) Applicant: Fujitsu Technology Solutions Intellectual Property GmbH, München (DE)

(72) Inventor: Timo Bruderek, Kutzenhausen (DE)

(73) Assignee: Fujitsu Technology Solutions Intellectual Property GmbH, Munich (DE)

( * ) Notice: Subject to any disclaimer, the term of this patent is extended or adjusted under 35 U.S.C. 154(b) by 0 days.

(21) Appl. No.: 15/108,707

(22) PCT Filed: Dec. 18, 2015

(86) PCT No.: PCT/EP2015/080643
§ 371 (c)(1),
(2) Date: Jun. 28, 2016

(87) PCT Pub. No.: WO2016/116236
PCT Pub. Date: Jul. 28, 2016

(65) Prior Publication Data
US 2017/0315819 A1    Nov. 2, 2017

(30) Foreign Application Priority Data
Jan. 21, 2015  (DE) .................. 10 2015 100 855

(51) Int. Cl.
*G06F 1/24* (2006.01)
*G06F 9/4401* (2018.01)
*G06F 1/26* (2006.01)
*G05B 19/042* (2006.01)
*G07G 1/12* (2006.01)
(Continued)

(52) U.S. Cl.
CPC ....... *G06F 9/4403* (2013.01); *G05B 19/0423* (2013.01); *G06F 1/24* (2013.01); *G06F 1/26* (2013.01); *G06F 1/28* (2013.01); *G06F 1/305* (2013.01); *G06F 1/3287* (2013.01); *G06F 9/442* (2013.01); *G07G 1/12* (2013.01); *G05B 2219/25056* (2013.01); *Y02D 10/171* (2018.01); *Y02D 50/20* (2018.01)

(58) Field of Classification Search
CPC ..................................... G06F 9/4403
See application file for complete search history.

(56) References Cited

U.S. PATENT DOCUMENTS 7,111,183 B1   9/2006  Klein et al.
2009/0046817 A1*  2/2009  Umeda .................. H04L 7/046
375/340
(Continued)

FOREIGN PATENT DOCUMENTS

EP          0 430 671 A2   6/1991

*Primary Examiner* — Kim Huynh
*Assistant Examiner* — Eric Chang
(74) *Attorney, Agent, or Firm* — DLA Piper LLP (US)

(57) ABSTRACT

An embedded system has a data processing apparatus that executes program code and a sequencing controller for switching components of the embedded system on and off, the data processing apparatus and the sequencing controller connected to one another via an individual control signal line, and the sequencing controller arranged to either switch off or restart the embedded system on the basis of a temporal profile of a control signal received via the control signal line.

19 Claims, 3 Drawing Sheets

(51) Int. Cl.
  *G06F 1/28* (2006.01)
  *G06F 1/30* (2006.01)
  *G06F 1/3287* (2019.01)

(56) References Cited

U.S. PATENT DOCUMENTS

2010/0169695 A1   7/2010  Jurgilewicz et al.
2010/0298999 A1   11/2010 Allgaier et al.
2014/0115354 A1*  4/2014  Jabbaz .................... H04L 12/10
                                                713/310

* cited by examiner

EMBEDDED SYSTEM, OPERATING METHOD AND THE USE THEREOF

TECHNICAL FIELD

This disclosure relates to an embedded system having a data processing apparatus that executes program code and a sequencing controller that switches components of the embedded system on and off. The disclosure also relates to an operating method for a sequencing controller and to the use of an embedded system or an operating method in a cash register system.

BACKGROUND

So-called sequencing controllers are nowadays frequently used in complex electronic apparatuses, in particular computer systems, to switch further components of the device on and off in a controlled manner. In this case, the term "sequencing controller" is generally used to denote a special microcontroller that supplies the further components with an operating voltage in a predetermined temporal sequence on the basis of one or more control signals. A separate control signal is generally transmitted to the sequencing controller for each switch-on sequence via a separate control signal line.

The space available to provide control signal lines is generally limited, in particular in embedded systems. It could therefore be helpful to provide an improved embedded system that makes it possible to implement different switch-on and switch-off sequences with a limited amount of available space. Summary I provide an embedded system having a data processing apparatus that executes program code and a sequencing controller for switching components of the embedded system on and off, the data processing apparatus and the sequencing controller connected to one another via an individual control signal line, and the sequencing controller arranged to either switch off or restart the embedded system on the basis of a temporal profile of a control signal received via the control signal line.

I also provide a method of operating a sequencing controller, including continuously monitoring a signal level of an input connection of the sequencing controller; permanently deactivating at least one data processing component connected to the sequencing controller if the signal level of the input connection is kept at a predetermined first signal level for a first predetermined period; and temporarily deactivating at least the data processing component if the signal level of the input connection repeatedly changes between the predetermined first signal level and a predetermined second signal level within the first predetermined period.

LIST OF REFERENCE SYMBOLS

Figure 1:
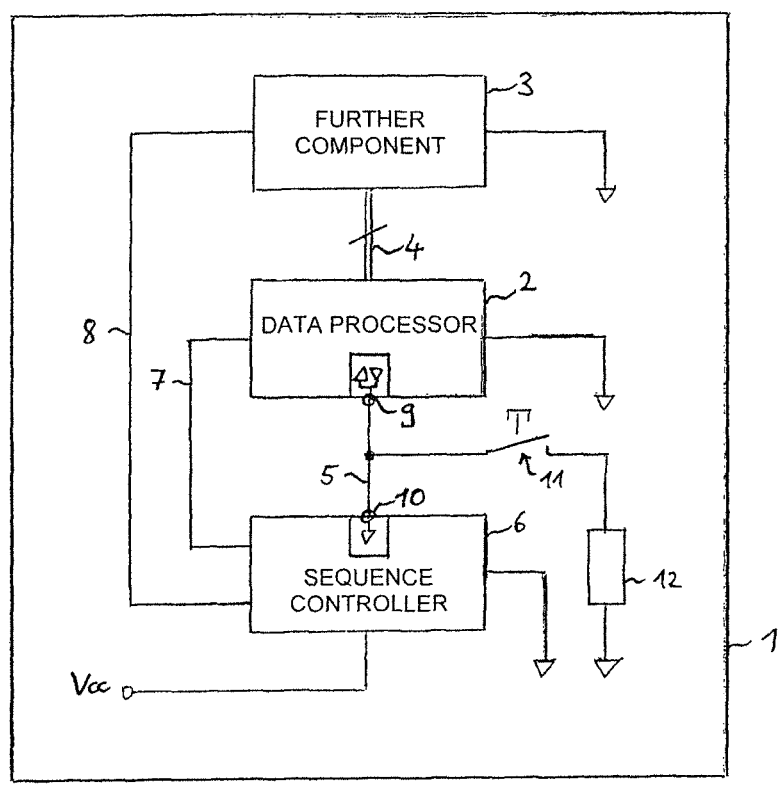
FIG. 1 shows a schematic illustration of an embedded system according to one configuration.

1 Embedded system
2 Data processing apparatus
3 Further component
4 Data bus
5 Control signal line
6 Sequencing controller
7 First supply line
8 Second supply line
9 First connection
10 Second connection
11 Pushbutton
12 Resistor
S1-S11 Method steps
Vcc Supply voltage
Z1 Switched-off state
Z2 Switched-on state

DETAILED DESCRIPTION

I provide an embedded system having a data processing apparatus that executes program code and a sequencing controller that switches components of the embedded system on and off In this case, the data processing apparatus and the sequencing controller connect to one another via an individual control signal line, and the sequencing controller is set up to either switch off or restart the embedded system on the basis of a temporal profile of a control signal received via the control signal line.

Evaluating a temporal profile of a control signal received via a control signal line makes it possible for a sequencing controller to initiate different switch-on and switch-off sequences without the need for space and connections for further control signal lines for this purpose. In particular, an embedded system can be either switched off normally or restarted on the basis of a distinction of the temporal profile by the sequencing controller.

The data processing apparatus may be set up to generate a static control signal at a first connection connected to the individual control signal line. The sequencing controller may be set up to switch off the embedded system upon receiving the static control signal at a second connection connected to the individual control signal line. The static control signal may comprise, for example, keeping the control signal line at a first signal level, in particular a logically low signal level, for a predetermined first period. Such signaling is compatible with known signaling schemes, in particular for manual switch-off.

The embedded system may have a pushbutton to switch the embedded system on and off by a user, the pushbutton being connected to the first connection of the data processing apparatus and to the second connection of the sequencing controller via the individual control signal line. Providing a pushbutton connected to the same control signal line makes it possible to request user-controlled activation or deactivation of the embedded system with a small amount of additional outlay on hardware.

The pushbutton may be set up upon actuation to pull the signal level of the individual control signal line to a predetermined first signal level, in particular a logically low signal level. The data processing apparatus may be set up, upon detecting the predetermined first signal level, to stop an operating system executed by the data processing apparatus and then transmit the static control signal to the sequencing controller. The two-stage approach described can be used to shut down the embedded system in a controlled manner without providing a further control signal line.

The data processing apparatus may be set up to generate an alternating control signal at the first connection connected to the individual control signal line. The sequencing controller may be set up to restart the embedded system upon receiving the alternating control signal at the second connection connected to the individual control signal line. For example, the alternating control signal may comprise a repeated change between a predetermined first signal level, in particular a logically low signal level, and a predetermined second signal level, in particular a logically high signal level, within a predetermined second period. Such signaling makes it possible to request an alternative switch-on or switch-off sequence, for example, a restart of the embedded system without providing a further control signal line.

The sequencing controller may be set up to restart the embedded system by switching off the data processing apparatus, waiting for a predetermined third period and then switching the data processing apparatus on again. In this case, such a sequence corresponds to a so-called "cold start" of the embedded system.

I also provide an operating method for a sequencing controller. The method comprises the steps of:
- continuously monitoring a signal level of an input connection of the sequencing controller,
- permanently deactivating at least one data processing component connected to the sequencing controller if the signal level of the input connection is kept at a predetermined first signal level, in particular a logically low signal level, for a first predetermined period, and
- temporarily deactivating the at least one data processing component if the signal level of the input connection repeatedly changes between the predetermined first signal level and a predetermined second signal level, in particular a logically high signal level, within the first predetermined period.

The above-mentioned operating method for a sequencing controller makes it possible to select different switch-on and switch-off sequences without providing further control signal lines.

The embedded system and the operating method are suitable, in particular, for use in a cash register system, for example, a payment terminal.

Further advantageous configurations are stated in the following detailed description of an example.

My systems and methods are described in detail below using an example with reference to the attached figures.

FIG. 1 shows a schematic illustration of an embedded system 1. In the example, the embedded system 1 is a payment terminal of a cash register system. The payment terminal comprises, inter alia, a reading apparatus that reads chip or magnetic cards and an authentication component, for example, a keypad to input a security code or a biometric recognition apparatus, for example, a so-called hand vein scanner.

To control the embedded system 1, the latter comprises a data processing apparatus 2 in the form of a microprocessor or a microcontroller. The data processing apparatus 2 is used, in particular, to execute an operating system and/or specific control software for the embedded system 1. The data processing apparatus executes an adapted version of the Linux operating system with an application running under it to implement different payment functions.

The data processing apparatus 2 connects to a further component 3 of the embedded system 1 via a data bus 4. The further component 3 may be the card reader or the authentication component, for example. Alternatively, the further component 3 may also be a mass memory apparatus, in particular a so-called flash memory that stores program code, or another component of the embedded system 1.

The data processing apparatus 2 also connects to a so-called sequencing controller 6 via an individual control signal line 5. The sequencing controller 6 connects to the data processing apparatus 2 and the further component 3 via supply lines 7 and 8. The sequencing controller 6 can be used to selectively supply the data processing apparatus 2 and the further component 3 with a supply voltage Vcc to switch them on and off in a controlled manner.

The control signal line 5 connects to a first connection 9 of the data processing apparatus 2. The first connection 9 is a combined input and output of the data processing apparatus 2. The control signal line 5 also connects to a second connection 10 of the sequencing controller 6. The second connection 10 is, in particular, a control input of the sequencing controller 6. The control signal line 5 may also connect to a ground potential via a pushbutton 11 and a resistor 12. The signal level of the control signal line 5 can therefore be selectively pulled to a low logic level via the pushbutton 11. In contrast, the control signal line 5 is at a high logic level, for example, 5 volts without actuation of the pushbutton 11 or corresponding driving of the signal line via the first connection 9.

Conventional sequencing controllers 6 evaluate their signal inputs only to determine whether they are at a high signal level or a low signal level. In contrast, the temporal profile of the signal level at the second connection 10 of the sequencing controller 6 is evaluated to initiate different signaling sequences. This is described in detail below with FIGS. 2 and 3.

Figure 2:
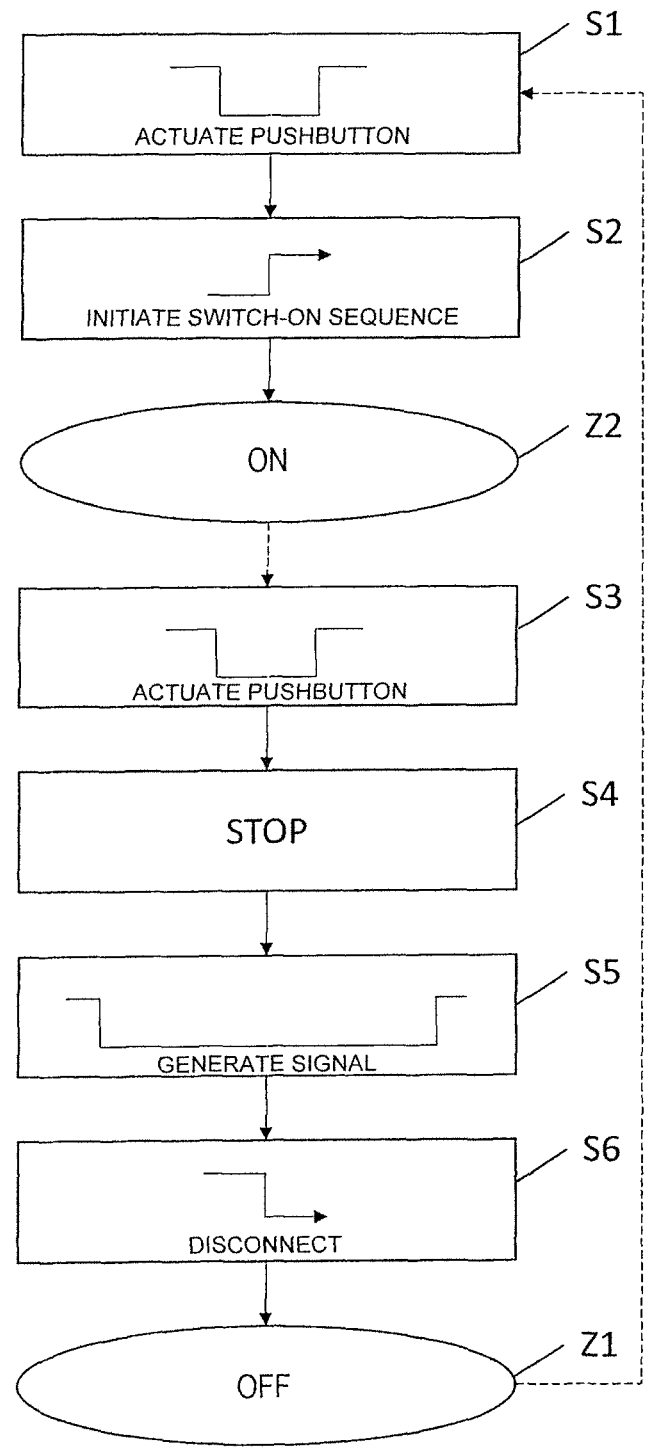
FIG. 2 shows a flowchart of a switching-on and switching-off process.

FIG. 2 shows a process of switching the embedded system 1 on and off. The embedded system 1 is originally in a switched-off state Z1. This means, in particular, that the data processing apparatus 2 and the further component 3 are not supplied with the supply voltage Vcc by the sequencing controller 6. In contrast, the sequencing controller 6 itself is supplied with the supply voltage Vcc even in the switched-off state Z 1.

In a first step S1, a user of the embedded system 1 actuates the pushbutton 11. As a result, the signal level of the control signal line 5 is pulled down to a low logic level for a relatively short period. Actuation of a pushbutton by a user typically lasts several hundred milliseconds. Actuation of the pushbutton in step S1 is detected by the sequencing controller 6 and signals a switch-on wish of the user in the state Z1.

In a subsequent step S2, the sequencing controller 6 accordingly initiates a switch-on sequence for the embedded system 1. In particular, it supplies the data processing apparatus 2 and the further component 3 with the supply voltage Vcc in a predetermined sequence. The embedded system 1 then starts up in a manner known per se, for example, by booting an operating system and executing predetermined applications, and is then in a switched-on state Z2.

The embedded system 1 remains in the state Z2 until a user requests shutting down of the embedded system 1 in a step S3 by actuating the pushbutton 11. In this case, the signaling corresponds to the signaling described with respect to step S 1. Unlike in the state Z1, the sequencing controller 6 does not react directly to the user's request in the switched-on state Z2.

Instead, the data processing apparatus 2 realizes, from the briefly falling signal level of the control signal line 5, that shutting down of the embedded system 1 is desired by the user. For this purpose, the connection 9 of the data processing apparatus 2 is connected as the input in the state Z2. Accordingly, the data processing apparatus 2 carries out a sequence to stop the embedded system 1 in step S4. This comprises, in particular, stopping any running applications and shutting down an operating system.

The data processing apparatus 2 then connects the connection 10 as the output in step S5 and generates a static control signal on the control signal line 5. For example, it pulls the control signal line 5 down to a logically low signal level for a relatively long period, for example, 4 seconds or longer.

In step S6, the sequencing controller 6 recognizes the predetermined signal pattern in the form of the static control signal and then disconnects the data processing apparatus 2 and the further component 3 from the supply voltage Vcc. The embedded system 1 is then in the switched-off state Z1 again.

The static control signal generated by the data processing apparatus 2 corresponds to a known signal for the forced shutdown of electronic devices. As a result, it is possible, in particular, to also force the embedded system 1 to be shut down by virtue of the user actuating the pushbutton 11 for an accordingly long time. This is advantageous, in particular, when the software running on the data processing apparatus 2 has crashed and is therefore no longer able to generate the static control signal in response to the user's request.

Figure 3:
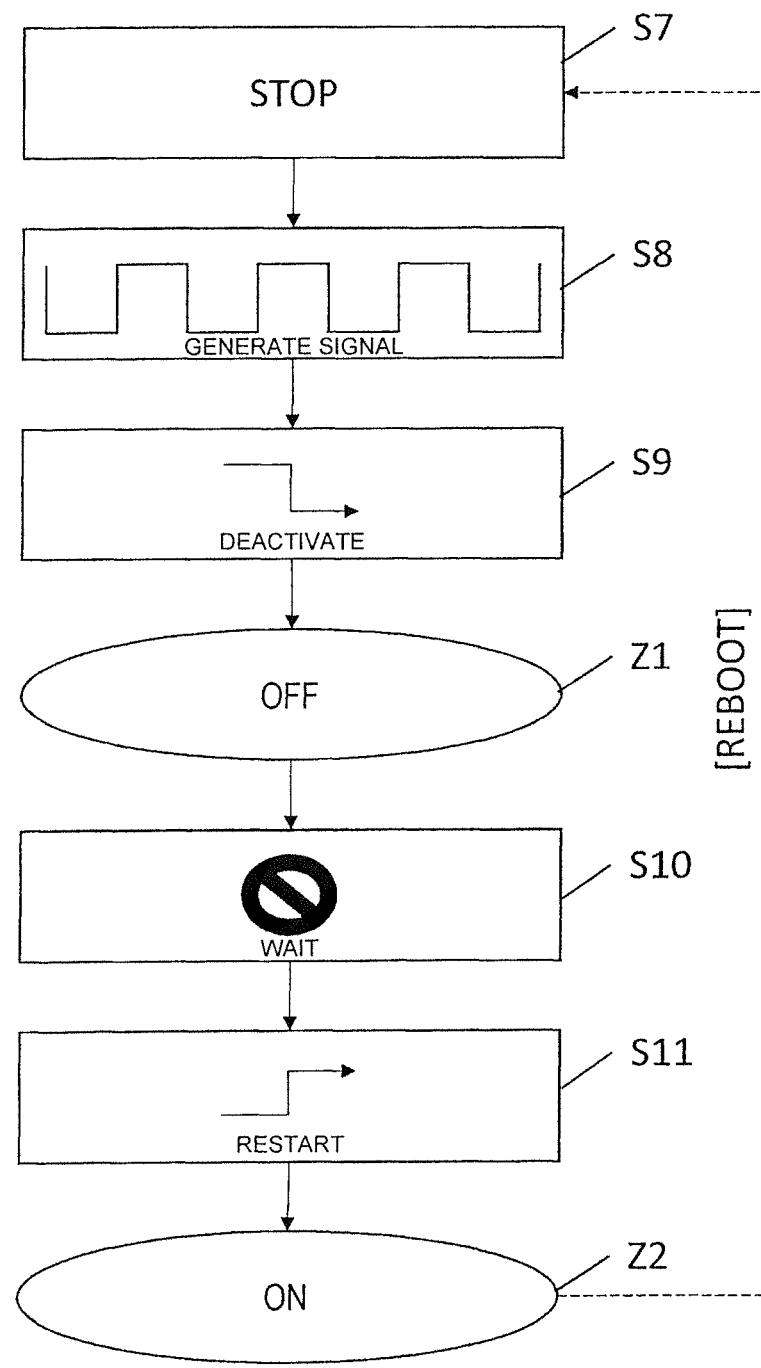
FIG. 3 shows a flowchart of a cold-start process.

FIG. 3 shows a flowchart of a method of cold-starting the embedded system 1. Such a cold start (cold boot or reboot) is required in the embedded system 1, for example, for security reasons or to install new software.

The embedded system 1 is initially in the switched-on state Z2. The software running on the data processing apparatus 2 then requests a cold start of the embedded system 1. In response to this, the data processing apparatus 2 shuts down the embedded system 1 in a step S7, as described above using step S4.

The data processing apparatus 2 then generates an alternating control signal in a step S8. For example, the signal level of the control signal line 5 is pulled to a low logic level for a period of 10 milliseconds in each case and is then brought back to a high logic level by accordingly controlling the first connection 9 as the output. This signaling is preferably repeated several times. For example, the signaling can be repeated for the period of 4 seconds.

In a step S9, the sequencing controller 6 detects the alternating control signal and then deactivates the data processing apparatus 2 and the further component 3, as described above with respect to step S6. The embedded system is then temporarily in the switched-off state Z1.

Unlike in the normal switching-off method according to FIG. 2, the sequencing controller 6 then waits for a predetermined period, for example, a period of 3 seconds in a step S10 before the embedded system 1 is restarted in a further step S 11 without further user interaction by applying the supply voltage Vcc to the components 2 and 3. In this case, the restart in step S11 corresponds to the start according to step S2 described above. The embedded system is then in the switched-on state Z2 again.

The sequence described above enables a software-controlled cold start of the embedded system 1. User interaction is not required for this purpose. This is advantageous, in particular, if the embedded system 1 is intended to be remotely restarted for maintenance purposes.

The described apparatus and method therefore make it possible to initiate different switch-on and switch-off sequences of the embedded system 1 using an individual control signal line 5. This also makes it possible to implement further switch-on and switch-off sequences by updating the control software of the data processing apparatus 2 or of the sequencing controller 6 without changing the hardware of the embedded system 1.

The invention claimed is:

1. An embedded system having a data processing apparatus that executes program code and a sequencing controller for switching components of the embedded system on and off, the data processing apparatus and the sequencing controller connected to one another via a single control signal line, the single control signal line being further connected to a ground potential via a pushbutton and a resistor such that a signal level of the control signal line can be selectively pulled to a low logic level via the pushbutton, and the sequencing controller arranged to initiate a switch-on sequence for the embedded system upon detection that the signal level of the control signal line is pulled down to the low logic level by actuation of the pushbutton for a short period of time in a switched-off state of the embedded system, and either switch off or restart the embedded system on the basis of a temporal profile of a control signal received via the control signal line received from the data processing apparatus in the switched-on state of the embedded system, wherein the data processing apparatus is set up to generate a static control signal at an output connection connected to the single control signal line, and the sequencing controller is set up to switch off the embedded system upon receiving the static control signal at an input connection connected to the single control signal line.

2. An embedded system having a data processing apparatus that executes program code and a sequencing controller for switching components of the embedded system on and off, the data processing apparatus and the sequencing controller connected to one another via an individual control signal line, the sequencing controller arranged to either switch off or restart the embedded system on the basis of a temporal profile of a control signal received via the control signal line, the data processing apparatus is set up to generate a static control signal at a first connection connected to the individual control signal line, and the sequencing controller is set up to switch off the embedded system upon receiving the static control signal at a second connection connected to the individual control signal line.

3. The embedded system according to claim 2, wherein the static control signal comprises keeping the control signal line at a first signal level for a predetermined first period.

4. The embedded system according to claim 2, further comprising a pushbutton that switches the embedded system on and off by a user, the pushbutton connected to the first connection of the data processing apparatus and to the second connection of the sequencing controller via the individual control signal line.

5. The embedded system according to claim 4, wherein the pushbutton is set up, upon actuation, to pull the signal level of the individual control signal line to a predetermined first signal level and the data processing apparatus is set up, upon detecting the predetermined first signal level, to stop an operating system executed by the data processing apparatus and to then transmit the static control signal to the sequencing controller.

6. The embedded system according to claim 2, wherein the data processing apparatus is set up to generate an alternating control signal at the first connection connected to the individual control signal line, and the sequencing controller is set up to restart the embedded system upon receiving the alternating control signal at the second connection connected to the individual control signal line.

7. The embedded system according to claim 6, wherein the alternating control signal comprises a repeated change between a predetermined first signal level and a predetermined second signal level within a predetermined second period.

8. The embedded system according to claim 2, wherein the sequencing controller is set up to restart the embedded system by switching off the data processing apparatus, waiting for a predetermined third period and then switching the data processing apparatus on again.

9. The embedded system according to claim 2, wherein the embedded system is at least one of a cash register system and a payment terminal.

10. The embedded system according to claim 2, wherein the restart of the embedded system comprises at least a cold start of the embedded system.

11. The embedded system according to claim 2, wherein the sequencing controller is a microcontroller that supplies the components of the embedded system, including the data processing system, with an operating voltage in a predetermined temporal sequence on the basis of one or more control signals received via the control signal line.

12. The embedded system according to claim 2, wherein the sequencing controller is set up to restart the embedded system by switching off the data processing apparatus, waiting for a predetermined third period and then switching the data processing apparatus on again.

13. The embedded system according to claim 2, wherein the restart of the embedded system comprises at least a cold start of the embedded system.

14. A method of operating a sequencing controller, comprising:
   continuously monitoring a signal level of an input connection of the sequencing controller connected by a single control line to an output connection of a data processing apparatus;
   permanently deactivating at least one component connected to the sequencing controller, comprising the data processing apparatus, if the signal level of the input connection is kept at a predetermined first signal level for a first predetermined period; and
   temporarily deactivating at least the data processing component if the signal level of the input connection repeatedly changes between the predetermined first signal level and a predetermined second signal level within the first predetermined period,
   wherein the data processing apparatus is set up to generate a static control signal at the output connection connected to the single control signal line, and the sequencing controller is set up to switch off the embedded system upon receiving the static control signal at the input connection connected to the single control signal line.

15. The method according to claim 14, wherein the embedded system is at least one of a cash register system and a payment terminal.

16. The method according to claim 14, further comprising:
   requesting a cold start by a software running on the data processing component; and
   in response to the requesting, shutting down, by the data processing component, an embedded system comprising the data processing component and the sequencing controller.

17. The method according to claim 16, further comprising:
   installing a new software after the cold start of the embedded system.

18. The method according to claim 14, further comprising:
   waiting, by the sequencing controller, for a predetermined period of time after temporarily deactivating the at least the data processing component; and
   applying, by the sequencing controller, a supply voltage to the data processing components without further user interaction.

19. The method according to claim 14, wherein the first signal level corresponds to a logically low signal level and the second signal level corresponds to a logically high signal level.

* * * * *